United States Patent [19]

Boothe et al.

[11] Patent Number: 4,951,809
[45] Date of Patent: Aug. 28, 1990

[54] CONVEYOR CONSTRUCTION

[75] Inventors: David V. Boothe, Rochester; David R. Barnwell, Rochester Hills, both of Mich.

[73] Assignee: Steel Master Transfer Inc., Pontiac, Mich.

[21] Appl. No.: 380,689

[22] Filed: Jul. 14, 1989

Related U.S. Application Data

[63] Continuation of Ser. No. 167,645, Mar. 14, 1988, abandoned.

[51] Int. Cl.⁵ .............................................. B65G 15/60
[52] U.S. Cl. .................................. 198/841; 198/860.2; 198/861.1
[58] Field of Search .................. 198/841, 860.3, 860.2, 198/861.1, 836

[56] References Cited

U.S. PATENT DOCUMENTS

| | | | |
|---|---|---|---|
| 966,488 | 8/1910 | Torseth . | |
| 3,367,718 | 2/1968 | Hauschopp . | |
| 3,596,752 | 8/1971 | Garvey | 198/841 |
| 3,605,994 | 9/1971 | Parlette | 198/841 X |
| 3,669,244 | 6/1972 | Pagdin et al. | 198/841 |
| 3,739,904 | 6/1973 | Windstrup | 198/836 |
| 3,779,368 | 12/1973 | Smith | 198/841 |
| 3,800,938 | 4/1974 | Stone | 198/841 |
| 3,820,650 | 6/1974 | Garvey . | |
| 3,825,108 | 7/1974 | Stone | 198/861.1 |
| 3,835,982 | 9/1974 | Zappia | 198/841 X |
| 3,848,732 | 11/1974 | Catalano | 198/841 X |
| 3,881,594 | 5/1975 | Jepson | 198/841 X |
| 3,944,059 | 3/1976 | Garvey . | |
| 4,056,180 | 11/1977 | Gunti . | |
| 4,164,283 | 8/1979 | Flajnik | 198/841 X |
| 4,274,535 | 6/1981 | Haas, Sr. et al. . | |
| 4,399,908 | 8/1983 | Gunti . | |
| 4,511,031 | 4/1985 | Lachonius . | |
| 4,556,143 | 12/1985 | Johnson . | |
| 4,627,529 | 12/1986 | Tarlton et al. | 198/841 X |
| 4,664,253 | 5/1987 | Fahrion | 198/841 X |
| 4,727,981 | 3/1988 | Johansson | 198/841 |

Primary Examiner—David A. Bucci
Assistant Examiner—D. Glenn Dayoan
Attorney, Agent, or Firm—Harness, Dickey & Pierce

[57] ABSTRACT

An improved conveyor assembly is disclosed which is specifically designed to maximize the use of standardized components yet still afford a maximum degree of flexibility in assembly whereby a wide variety of styles and widths of conveyor chain may be easily and conveniently accommodated. The conveyor assembly of the present invention incorporates standardized lengths of side rails which may be secured together in both end to end as well as side by side relationship so as to accomplish the above objectives. Various arrangements are also disclosed for accomplishing this assembly of components. Further, each of the side rails incorporate a pair of spaced continuous outwardly opening channels which are ideally suited for mounting of any auxiliary equipment desired as well as support for guide strips or the like.

16 Claims, 6 Drawing Sheets

CONVEYOR CONSTRUCTION

This is a continuation of U.S. patent application Ser. No. 167,645, filed Mar. 14, 1988 now abandoned.

BACKGROUND AND SUMMARY OF THE INVENTION

The present invention relates generally to conveyor assemblies and more specifically to a modular conveyor system which is specifically designed to accommodate a wide variety of conveyor chain types and sizes.

In manufacturing operations there exist a wide variety of applications where workpieces must be transported from one location to another. In order to accomplish these tasks a wide variety of conveyor mechanisms have been developed. The present invention is concerned primarily with endless conveyors employing chains of the type comprising a plurality of flexibly interconnected links which provide a generally flat moving upper surface for supporting and transporting various types of articles. Because such conveyor chain is readily available in a wide variety of widths and types, it has been necessary that the supporting guide structure be custom designed and manufactured for each type and/or width of chain. This requirement results in relatively high costs for such conveyor installations.

The present invention, however, provides a conveyor system which overcomes these disadvantages in that it employs side rail support members which are specifically designed to enable them to accommodate an exceedingly broad range of conveyor chain types and sizes. Additionally, the side rails employed in the present invention are provided with suitable outwardly facing channels extending the length thereof which enable quick and easy attachment of a wide variety of auxiliary equipment as well as supporting struts for maintaining the conveyor at the desired elevation. The side rails are preferably fabricated from extruded aluminum and are designed to provide support to both transfer and return runs of the conveyor chain. Suitable spacer members are provided which enable the side rails to be connected with any desired spacing so as to accommodate the various widths of conveyor chain available. Preferably suitable wear strips will also be provided on the side rails to prevent excessive wear of the conveyor chain during operation. The side rails are well suited for accommodating both horizontal and vertical curves in the conveyor thus eliminating the need to separately fabricate and stock special assemblies to cover such applications. Accordingly, the conveyor apparatus of the present invention provides an economical, versatile arrangement which enables conveyor systems to be easily and conveniently assembled regardless of the specific type or size of chain preferred by the end user.

Additional advantages and features of the present invention will become apparent from the subsequent description and the appended claims taken in conjunction with the accompanying drawings.

DESCRIPTION OF THE PREFERRED EMBODIMENTS

Figure 1:
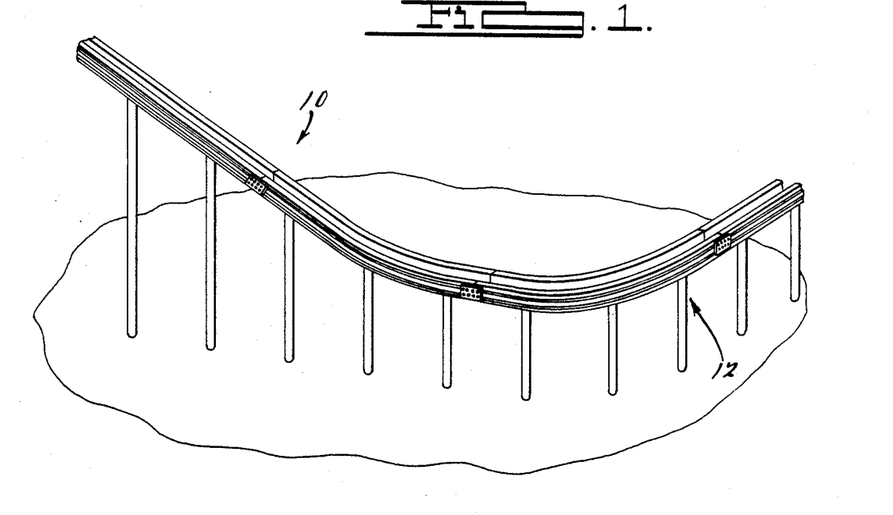
FIG. 1 is a perspective view of a conveyor system in accordance with the present invention showing an application incorporating both horizontal and vertical curves.
Figure 2:
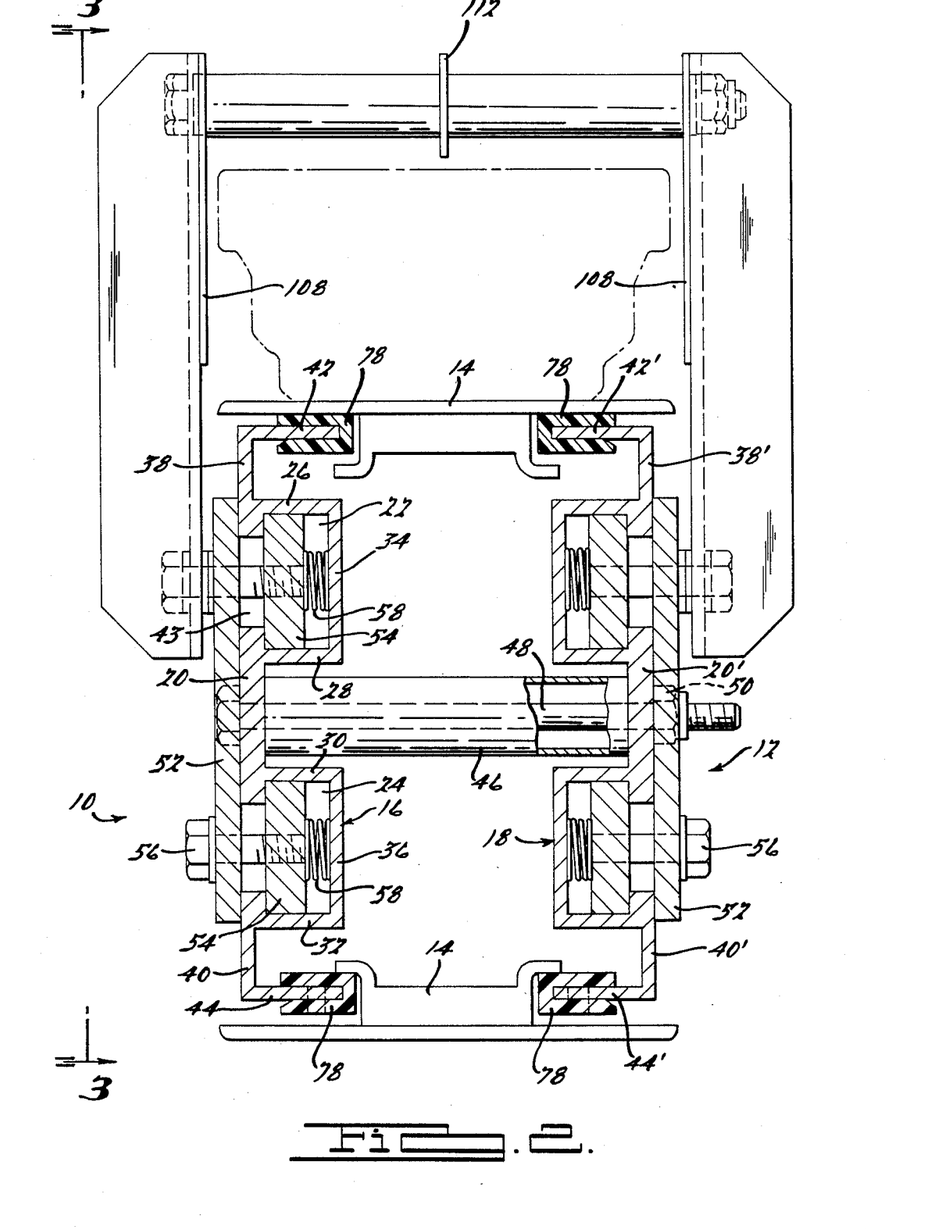
FIG. 2 is a section view of a conveyor assembly in accordance with the present invention, the section being taken along a plane extending substantially perpendicular to the direction of movement and transversely of the conveyor.
Figure 3:
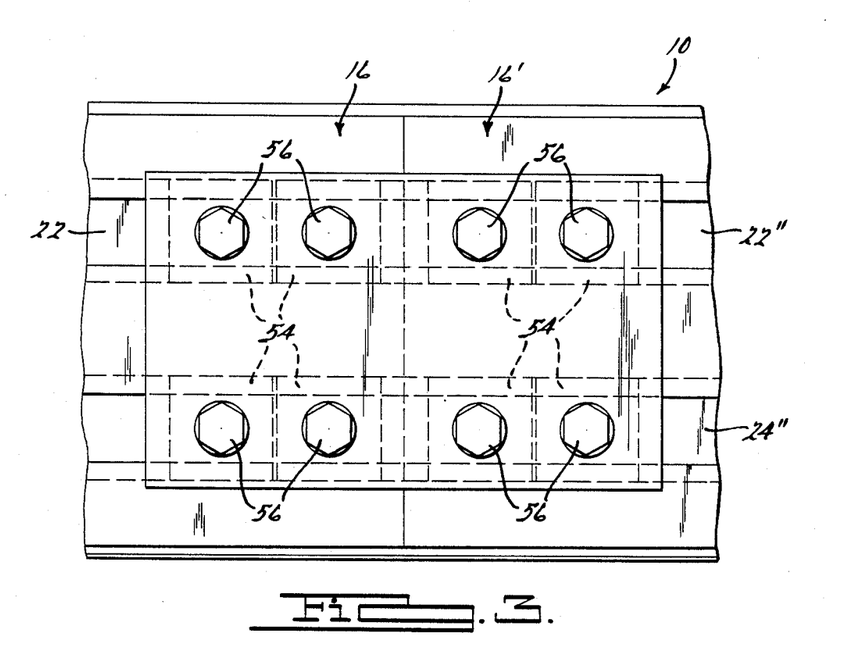
FIG. 3 is an enlarged fragmentary view of joint showing a pair of side rail sections secured in end to end relationship as viewed from line 3—3 of FIG. 2.

Referring now to the drawings and in particular to FIGS. 1 through 3, there is shown a conveyor assembly indicated generally at 10. Conveyor assembly 10 includes a guiding support assembly 12 which is operative to support and guide movement of continuous conveyor chain 14, in both forward and return directions. Conveyor chain 14 is generally of the type comprising a plurality of loosely interconnected links each link incorporating a generally flat upper work supporting surface and depending flanges which are designed to cooperate with suitable supporting flanges for guiding movement of the chain. A wide variety of types and widths of such chain are commercially available and in use in various applications. Hence, the conveyor chain does not form a part of the present invention. Rather, the present invention is directed to the supporting structure for such chain and more specifically to a supporting structure which is designed to accommodate such varying types of chain in terms of both style and width.

As best seen with reference to FIG. 2, support assembly 12 comprises a pair of substantially identical elongated rail members 16 and 18 which are secured together by suitable fastening means in generally spaced parallel relationship. As rails 16 and 18 are virtually mirror images of each other, a detailed description of only rail 16 will be provided, like portions of rail 18 being indicated by like numbers primed.

As shown in FIG. 2, rail member 16 includes a generally vertically extending central main wall section 20 having a pair of channels 22, 24 formed adjacent upper and lower ends thereof, said channels being defined by upper and lower inwardly projecting sidewalls 26, 28 and 30, 32 respectively and inner end walls 34, 36 respectively extending therebetween. A pair of additional vertically extending walls 38, 40 project upwardly and downwardly from respective channels 22 and 24 a short distance. A pair of laterally inwardly extending flanges 42 and 44 are provided at the respective outer ends of walls 38 and 40 and are positioned in substantially parallel spaced relationship with respect to sidewalls 26 and 32 defining in part channels 22 and 24. Preferably, wall portions 38, 40 and 20 will all have outer surfaces positioned in coplanar relationship so as to provide a suitable surface for clamping of various items such as support members, auxiliary equipment and/or guide rails as hereinafter described in greater detail. Additionally, it should be noted that wall 38 and wall 20 each have relatively short portions extending toward each other from the respective junctures with sidewalls 26 and 28 so as to define a restricted or reduced size opening 43 into channel 22. Similarly, walls 40 and 20 each have relatively short portions extending toward each other from the respective junctures with sidewalls 32 and 30 so as to define a restricted or reduced size opening 45 into channel 24.

Preferably, rails 16 and 18 will be fabricated from aluminum by a suitable extrusion process and of suitable lengths to provide for easy and convenient handling, shipping and assembly thereof. It should be understood that the cross-sectional shape as shown in FIG. 2 is consistent along the entire length of each section which may be for example approximately 10 feet long. The design of rail members 16 and 18 is extremely well suited to provide great flexibility in design and construction of conveyor supports. As shown in FIG. 1, the rails are of a size to enable both horizontal and vertical turns to be easily accommodated by merely rolling the respective channels to achieve the desired radius turns.

Referring once again to FIG. 2, rail sections 16 and 18 are intended to be secured together in spaced substantially parallel relationship. In order to accomplish this a suitable length of hollow spacer tubing 46 preferably also of aluminum is provided which is positioned so that opposite ends thereof abut the inner surfaces of respective center walls 20 and 20'. A suitable length bolt 48 may then be inserted through suitably positioned drilled openings in sidewalls 20 and 20' and secured via nut 50 so as to clamp the respective rail members in the desired spaced relationship. Such fasteners will be spaced along the length of the respective rail members at intervals as dictated by the required design criteria. Preferably, spacer tubing 46 will be of a sufficient diameter to provide an adequate load bearing surface engageable with walls 20 and 20' to prevent canting of upper and lower end portions of rails 16 and 18. It should be noted that spacer tubing 46 may be easily stocked in relatively long lengths and cut to any desired length required so as to enable rail members 16 and 18 to be suitably spaced to accommodate virtually any width conveyor chain. Alternatively, however, suitable solid stock may be used in place of tubing 46 in which case threaded holes may be provided in opposite ends thereof to accommodate suitable threaded fasteners.

As previously mentioned, rail sections 16 and 18 will preferably be fabricated in suitable lengths to facilitate handling and assembly. As typical conveyor assemblies will require a substantial number of lengths of such rail sections, it is important to provide means to secure successive rail sections in abutting end-to-end relationship. In this regard it is important that the upper surfaces of flanges 42 be properly aligned so as to avoid possible jarring of the workpiece as the conveyor chain moves thereacross. The rail sections forming a part of the present invention are well suited for easy and convenient secure joining and a number of arrangements by which this may be accomplished are disclosed below.

As best seen with reference to FIGS. 2 and 3, a generally rectangular shaped plate member 52 is provided which overlaps abutting end portions of rails 16 and 16'. A plurality of nut plates 54 generally square in shape are disposed with respective channels 22, 24, 22" and 24" and are each provided with a suitably sized threaded hole. Preferably, each of the nut plates 54 will be of a width approximately or slightly less than the width of respective channels 22, 24 whereby the sidewalls thereof will operate to prevent rotation thereof. A plurality of threaded bolts 56 are also provided which extend through openings in plate 52 into threaded engagement with respective nut plates 54 and cooperate therewith to clamp wall sections 38, 20 and 40 therebetween. Preferably, a pair of such nut plates 54 and bolts 56 will be provided in each channel of each rail members 16 and 16' so as to insure a secure joining of the respective rail sections. Additionally, in order to facilitate assembly, it may be desirable to position a relatively small helical coil spring 58 between each of the nut plates 54 and inner walls 34, 36 of the channels so as to urge the nut plates 54 against the inner overlapping surfaces of walls 38, 20, and 40.

Figure 4:
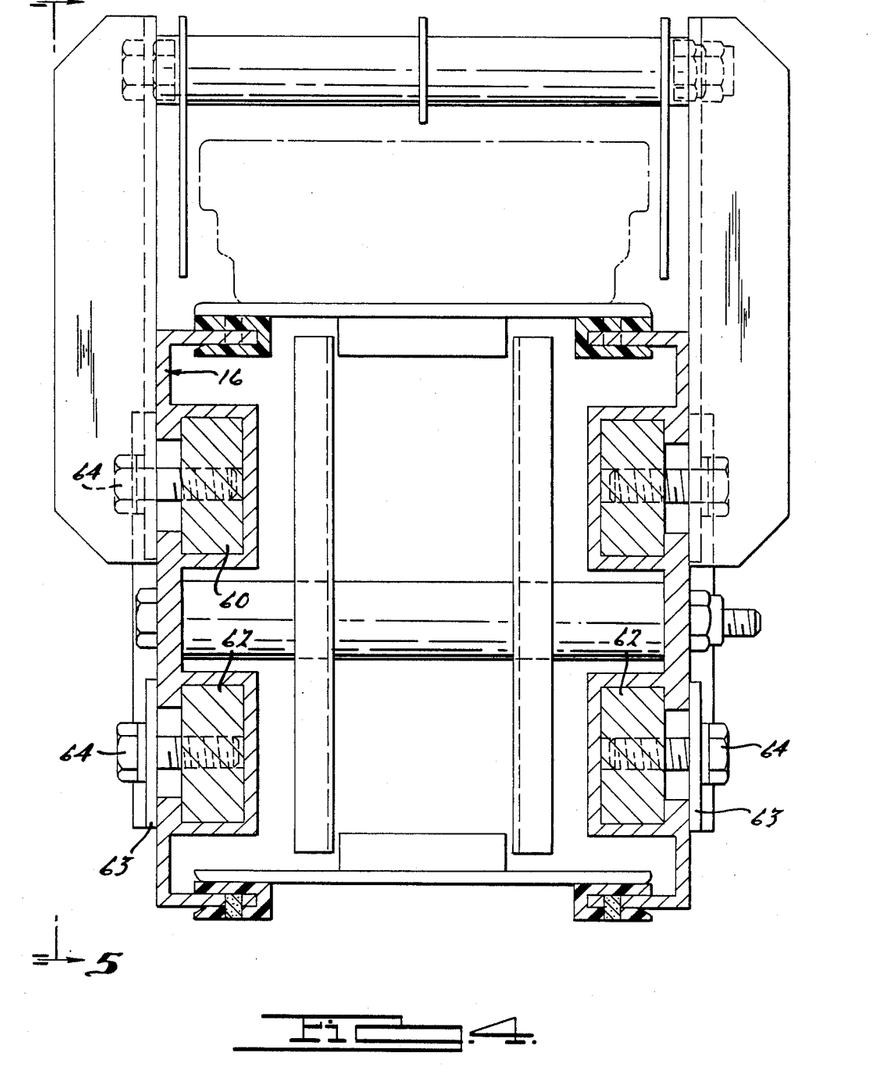
FIG. 4 is a view similar to that of FIG. 2 but showing an alternative joint arrangement and a different style conveyor chain.
Figure 5:
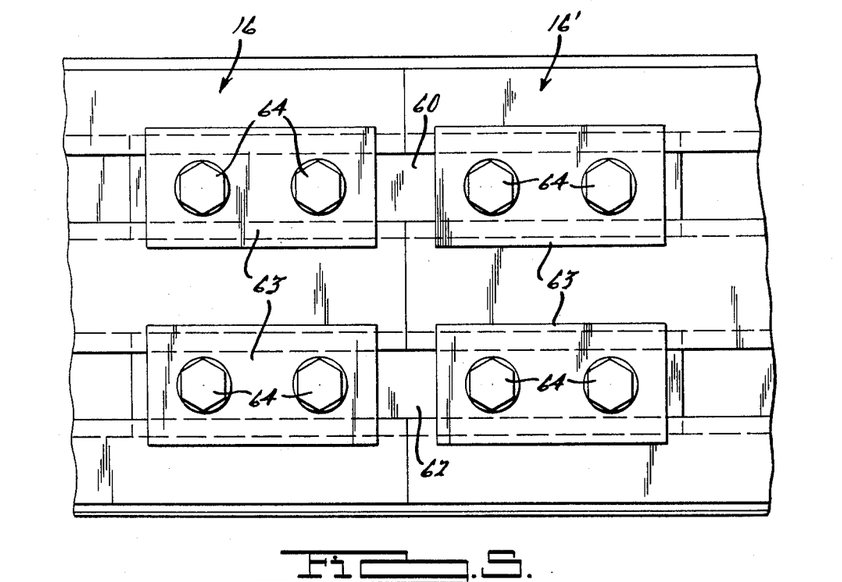
FIG. 5 is a view similar to that of FIG. 3 but showing the joint structure of FIG. 4 as seen from line 5—5 of FIG. 4.

Another joining arrangement is illustrated in FIGS. 4 and 5. In this arrangement, a pair of elongated bars 60, 62 preferably of aluminum are disposed within channels 22 and 24 so as to span the juncture between abutting ends of rails 16 and 16'. A pair of rectangular plate members 63 are also provided for each rail member through which fasteners 64 extend into threaded engagement with the respective bar members 60, 62 so as to thereby clamp the rail sections in abutting aligned relationship. Preferably, the bars 60 and 62 will have a vertical width just slightly smaller than the width of the respective channels such that they may be slid therealong for assembly and disassembly but yet will still provide sufficient rigidity to maintain alignment of the rail sections 16, 16'.

Figure 6:
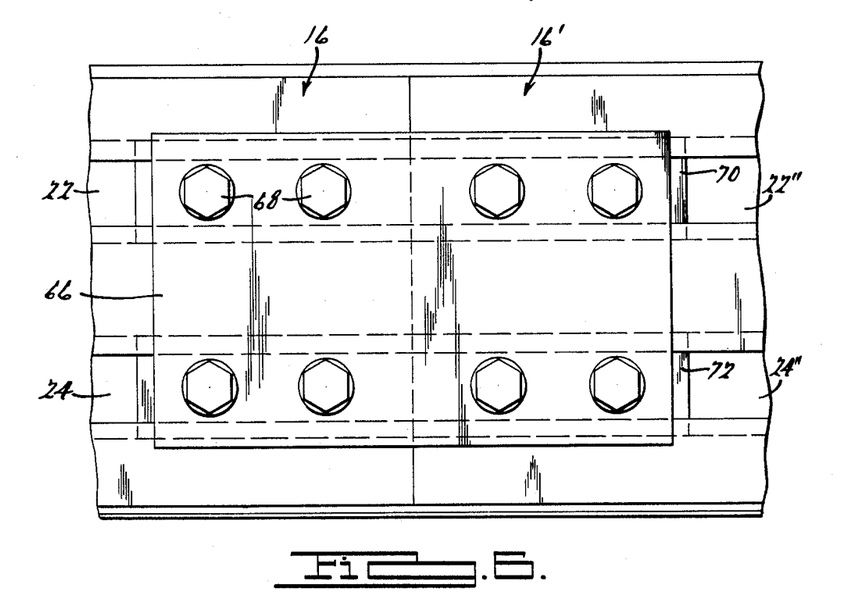
FIG. 6 is a view similar to that of FIG. 5 but illustrating a modification thereof in accordance with the present invention.

Another joining arrangement is illustrated in FIG. 6. In this embodiment, a single large rectangular plate 66 is provide which is clamped against outer surfaces of rails 16 and 16' by means of fasteners 68 which threadedly engage a pair of elongated bars 70 and 72 disposed within respective channels 22, 24. This arrangement offers the rigidity of both bars 70, 72 and plate 66 spanning the joint between opposed ends of rail members 16, 16'.

Figure 7:
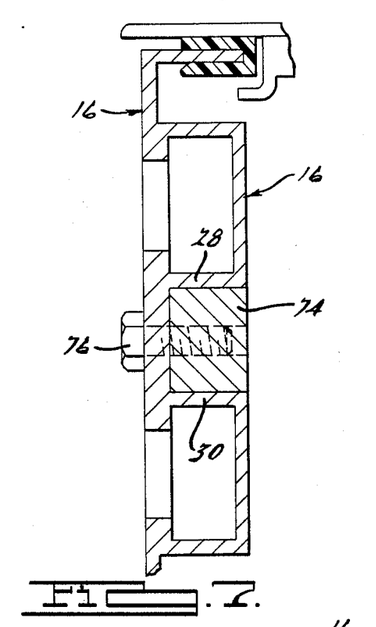
FIG. 7 is a fragmentary section view showing a further alternative joint arrangement.
Figure 8:
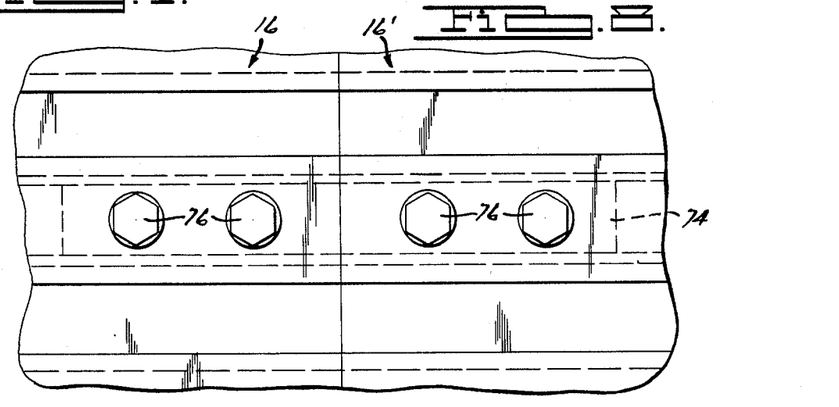
FIG. 8 is a side view of the joint arrangement of FIG. 7.

A further joining arrangement is shown in FIGS. 7 and 8. In this arrangement, a single elongated bar 74 is provided which bridges the juncture between rail sections 16 and 16'. However, bar member is positioned against the inner surface of wall 20 and cooperates only with the outer surfaces of channel sidewalls 28 and 30 to maintain rigidity of the assembly. A plurality of fasteners 76 are provided which extend through openings in wall 20 into threaded engagement with bar 74 so as to exert a clamping action therebetween. This arrangement offers the advantage of requiring assembly of a lesser number of components and also offers relatively easy and convenient assembly and disassembly.

Referring once again to FIG. 2, as previously mentioned, flanges 42, 42' operate to provide a supporting surface for the conveyor chain and the associated workpiece carried thereby. In order to avoid excessive wear of both the conveyor chain and rail members, i is preferable to provide a suitable elongated wear strip 78 of a generally U-shape in cross section. Preferably, these wear strips will be fabricated from a suitable low friction plastic material and may be impregnated with a suitable friction reducing lubricant. Similar wear strips are also provided on lower flanges 44, 44' to avoid excessive wear of other portions of the conveyor chain during the return run thereof as well as avoiding wear of the flanges themselves.

Figure 9:
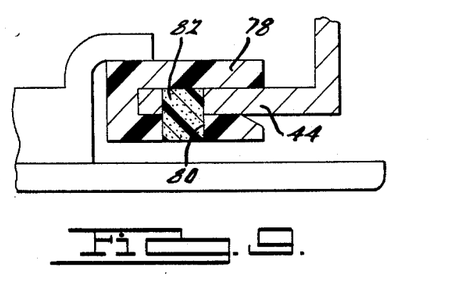
FIG. 9 is an enlarged fragmentary section view illustrating a wear strip secured to a flange portion of a side rail.

As best seen with reference to FIG. 9, in order to secure wear strip 78 to the respective flange portions such as flange 44, a relatively small diameter hole 80 is preferably drilled through wear member 38 and flange 44 which is then filled with a suitable adhesive material 82. Once the adhesive material 82 has set, it will provide both a bonding action therebetween as well as perform the function of a mechanical dowel pin interlock so as to thereby effectively prevent disengagement of the flange and associated wear strip. Preferably, holes 80 will be suitably spaced along the length of each of the wear strips 78.

Figure 10:
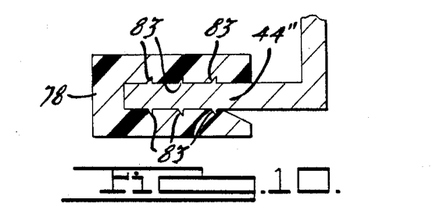
FIG. 10 is a view similar to that of FIG. 9 but showing an alternative arrangement for securing a wear strip to a flange.

Alternatively, as shown in FIG. 10, respective flanges 42, 44 may be provided with a plurality of longitudinally extending outwardly projecting spaced parallel ribs 83. Preferably these ribs will have an inclined ramp surface facing the outer terminal edge of the respective flanges to facilitate installation of the wear strip and a relatively sharp outer point so as to bite into the inner surface of wear strip 78 in order to retain same in position thereon once it has been assembled.

Figure 11:
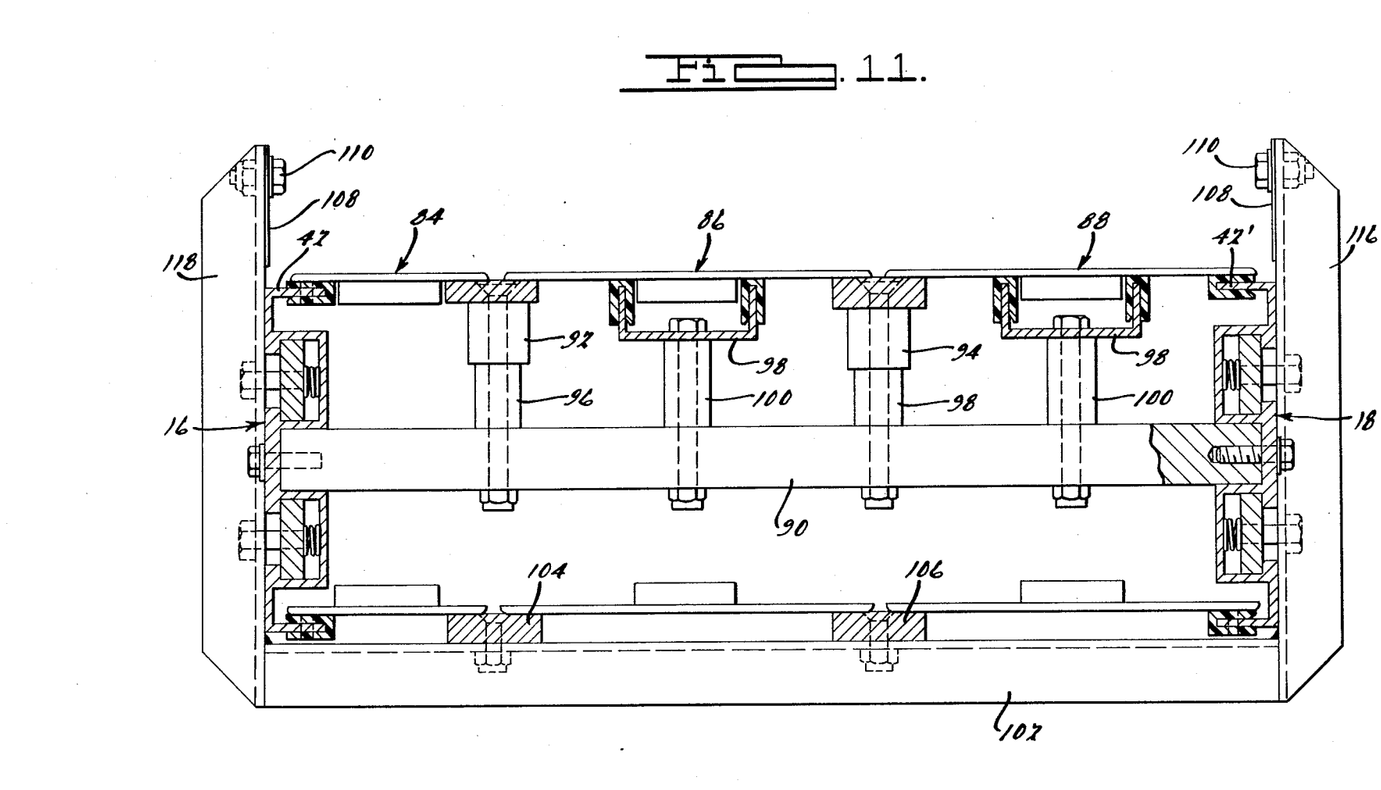
FIG. 11 is a section view similar to that of FIG. 2 but illustrating a conveyor assembly incorporating a plurality of parallel conveyor chains in accordance with the present invention.

As previously noted, an important advantage of the present invention is the ease by which the spacing of the rail members 16 and 18 may be selected so as to accommodate conveyor chains of different widths. This feature also enables the present invention to accommodate multiple runs of conveyor chain on the same support structure. As best seen with reference to FIG. 11, there is a conveyor structure incorporating three parallel runs of conveyor chain 84, 86, 88 with two different types of conveyor chain being illustrated.

As shown therein, a solid bar or rod 90 is employed to interconnect side rails 16 and 18 with suitable bolts threadedly engaging opposite ends thereof. Flanges 42 and 42' serve to support opposite outer edges of conveyor chain 84 and 88 in a manner similar to that described with reference to FIGS. 1-3. In order to support the inner edges of conveyor chain 84 and 88 as well as opposite edges of conveyor chain 86, a pair of spaced elongated bar members 92, 94 are provided which are preferably coextensive with rail members 16 and 18 and are supported by means of upstanding projections 96, 98 secured to bar member 90 in any suitable manner such as by bolts or the like. Depending on the type of conveyor chain employed, it may be necessary or desirable to incorporate additional guide/support means such as upstanding U-shaped elongated channel member 98 also supported on bar 90 by upstanding support member 100. Because of the close spacing between respective conveyor chains 84, 86, 88, it is not possible to support the return run thereof in the same manner as discussed above. Accordingly, suitably spaced cross bars 102 are provided extending between rails 16 and 18 which operate to support elongated bars 104, 106 which in turn serve to continuously support the conveyor chains 84, 86, and 88.

In many applications, it is desirable to provide such conveyor assemblies with opposite outer side guide members so as to prevent parts from being dislodged therefrom during transfer. In the present invention, this may be easily accomplished by providing relatively thin elongated strips 108 preferably of a suitable relatively flexible spring steel along opposite lateral sides of the conveyor chain as shown in both FIGS. 2 and 9. Preferably strips 108 will be of a width so as to extend a reasonable distance above the height of the part being transferred so as to avoid interference thereof with fasteners 110 being utilized to secure strips 108 in position. Additionally, as shown in FIG. 2, it may also be desirable to incorporate one or more additional strips 112 overlying the conveyor chain so as to further aid in restraining possible unintended movement of the part.

Figure 12:
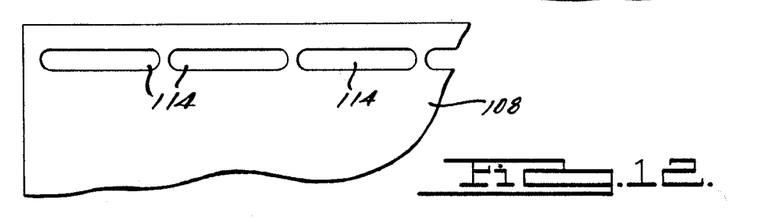
FIG. 12 is a side view of a guide rail utilized in connection with the conveyor assembly of the present invention.

Each of these strips 108 and 112 is preferably fabricated from spring steel and incorporates along an edge thereof a plurality of spaced elongated openings 114 as shown in FIG. 12. The provision of these elongated openings enable the strips to be flexed around any curves the conveyor may be required to negotiate and easily locked in place by securing bolts 110. Because of the provision of the elongated slots 114, it becomes an easy matter to adjust the side guides for proper curvature without the need to suitably contour and/or separately drill each section thereof.

In order to support these guide strips 108, pairs of upstanding angle brackets 116, 118 are provided which may be easily clamped to side rails 16, 18 by means of bolts and suitable nut plates 54 at virtually any desired location.

Thus, as may now be appreciated, the conveyor assembly of the present invention provides an extremely flexible design by which a wide variety of style and width conveyor chains may be easily and conveniently accommodated utilizing standardized components. This not only substantially reduces the costs associated with fabrication of the various parts but further enables the lead time required to construct the conveyor to be substantially reduced as it becomes economically feasible to stock the various components required. Further, these advantages are accomplished without any reduction in the durability or strength of the resulting conveyor assembly.

While it will be apparent that the preferred embodiments of the invention disclosed are well calculated to provide the advantages and features above stated, it will be appreciated that the invention is susceptible to modification, variation and change without departing from the proper scope or fair meaning of the subjoined claims.

We claim:

1. A conveyor assembly comprising:
   an endless conveyor chain loop supported for continuous movement to transfer workpieces from a first location to a second location; and
   means for movably supporting said conveyor chain loop, said supporting means comprising
   first and second substantially identical separately fabricated elongated rail members;
   a plurality of spaced means securing said rail members in substantially parallel spaced relationship at a plurality of points spaced along the length thereof, each of said rail members incorporating upper and lower substantially identical laterally projecting flange portions, said upper flange portions being spaced apart and operative to guide a first portion of said conveyor chain loop while said lower flange portions are spaced apart and operate to guide another return portion of said conveyor loop, each of said first and second rail members further being substantially symmetrical laterally about a longitudinally extending midline thereof, each of said first and second rail members including a pair of spaced substantially parallel channels extending along the length thereof, said assembly further comprising third and fourth elongated rail members adapted to be joined in end-to-end abutting relationship with said first and second rail members respectively, said third and fourth rail members being substantially identical to said first and second rail members, first and second plate means overlying the juncture between said first and third rail members and the juncture between said second and fourth rail members respectively and fastening means for clamping said plate member to respective pairs of said rail members, said fastening means including nut plates captured within each of said channels, said nut plates having threaded openings therein and said channels being further operative to prevent relative rotation of said nut plates.

2. A conveyor assembly as set forth in claim 1 wherein said nut plates of said fastening means comprises elongated bars disposed within each of said channels and adapted to extend across each of said junctures, each of said bars including threaded openings therein for receiving said fastening means to clamp said plate means to said rail members, said bars cooperating with said channels to retain said abutting rail members in aligned relationship.

3. A conveyor assembly as set forth in claim 1 wherein said securing means comprise a plurality of longitudinally spaced fastener means extending between said first and second rail members and spacer means associated with each of said fastener means, said spacer means cooperating with said fastener means to retain said rail members in said spaced substantially parallel relationship.

4. A conveyor assembly as set forth in claim 1 further comprising wear strips provided on each of said upper and lower spaced flange portions.

5. A conveyor assembly as set forth in claim 4 further comprising means securing said wear strips to said flange portions.

6. A conveyor assembly as set forth in claim 5 wherein said wear strip securing means comprise a plurality of longitudinally spaced aligned openings in said wear strip and said flanges and an adhesive material disposed within said aligned openings.

7. A conveyor assembly as set forth in claim 5 wherein said wear strip securing means comprise projections extending outwardly from said flanges and bitingly engaging an abutting surface of said wear strip.

8. A conveyor assembly as set forth in claim 7 wherein each of said wear strip surrounds the end portion of each of said flange portions.

9. A conveyor assembly as set forth in claim 1 further comprising guide means supported by said rail members, said guide means extending upwardly from said rail members adjacent opposite sides thereof and including a substantially continuous surface operative to retain items being carried by said conveyor chain.

10. A conveyor assembly as set forth in claim 9 wherein said guide means includes relatively thin elongated spring steel strips of substantial width positioned adjacent opposite sides of said conveyor chain and support means secured to said rail members for supporting said strips.

11. A conveyor assembly comprising:
an endless conveyor chain loop supported for continuous movement to transfer workpieces from a first location to a second location; and
means for movably supporting said conveyor chain loop comprising a plurality of rail assemblies, each rail assembly including
first and second substantially identical separately fabricated elongated rail members, each said rail member having a pair of spaced substantially parallel outwardly opening channels extending along the length thereof and longitudinally extending flange portions overlying opposite sides of said channels to define a restricted opening into said channels, and substantially identical upper and lower flange portions, said first rail member being substantially symmetrical laterally about a longitudinally extending midline thereof, and said second rail member being substantially symmetrical laterally about a longitudinally extending midline thereof,
a plurality of spaced means extending between and securing said rail members together in substantially parallel spaced relationship at a plurality of points spaced along the length thereof with said upper and lower flange portions of said rail members being spaced apart so as to guidingly receive a portion of said conveyor chain therebetween, said upper flange portions being positioned in substantially coplanar relationship so as to support a first portion of said conveyor chain and said lower flange portions being positioned in substantially coplanar relationship for supporting a return portion of said conveyor chain,
wear strips surrounding the terminal ends of each of said upper and lower flange portions, means securing said wear strips to said respective upper and lower flange portions,
successive ones of said rail assemblies being adapted to be secured in end-to-end relationship, and
means for securing respective ones of said first and second rail members in end-to-end relationship.

12. A conveyor assembly as set forth in claim 11 wherein said end-to-end securing means include fasteners cooperating with each of said outwardly opening channels to secure said rail assemblies together.

13. A conveyor assembly as set forth in claim 11 further comprising elongated relatively wide spring steel guide plates and means supporting said guide plates adjacent opposite sides of said conveyor chain, said guide plate support means being secured to respective of said first and second rail members via said channels.

14. A conveyor assembly as set forth in claim 13 wherein each of said elongated guide plates includes a plurality of longitudinally extending spaced slots provided therein, said slots being adapted to accommodate fasteners for securing said plates to said support means.

15. A conveyor assembly as set forth in claim 13 further comprising an elongated top guide plate supported by said support means in overlying spaced relationship to said conveyor chain, said top guide plate being operative to aid in restraining movement of said workpiece with respect to said conveyor chain.

16. A conveyor assembly comprising:
an endless conveyor chain loop supported for continuous movement to transfer workpieces from a first location to a second location; and
means for movably supporting said conveyor chain loop comprising a plurality of rail assemblies, each rail assembly including
first and second substantially identical separately fabricated elongated rail members, each said rail member having a pair of spaced substantially parallel outwardly opening channels extending along the length thereof and longitudinally extending flange portions overlying opposite sides of said channels to define a restricted opening into said channels, and substantially identical upper and lower flange portions, each of said rail members being substantially symmetrical laterally about a longitudinally extending midline thereof,
means securing said rail members together in substantially parallel spaced relationship at a plurality of points spaced along the length thereof with said upper and lower flange portions of said rail members being spaced apart so as to guidingly receive a portion of said conveyor chain therebetween, said upper flange portions being positioned in substantially coplanar relationship so as to support a first portion of said conveyor chain and said lower flange portions being positioned in substantially coplanar relationship for supporting a return portion of said conveyor chain,
wear strips surrounding the terminal ends of each of said upper and lower flange portions, means securing said wear strips to said respective upper and lower flange portions,
successive ones of said rail assemblies being adapted to be secured in end-to-end relationship, and
means for securing respective ones of said first and second rail members in end-to-end relationship, said securing means comprising a joint plate member spanning the juncture between adjacent rail members of respective rail assemblies, threaded nut plates disposed within each of said channels, and fasteners extending through said joint plate and threadedly engaging respective ones of said nut plates to claim said joint plate to said rail members.

* * * * *